May 20, 1952     S. B. HASELTINE     2,597,147
ONE-PIECE SUPPORTING BRACKET
FOR TRACKS FOR SLIDING DOORS
Filed Oct. 8, 1947     2 SHEETS—SHEET 1
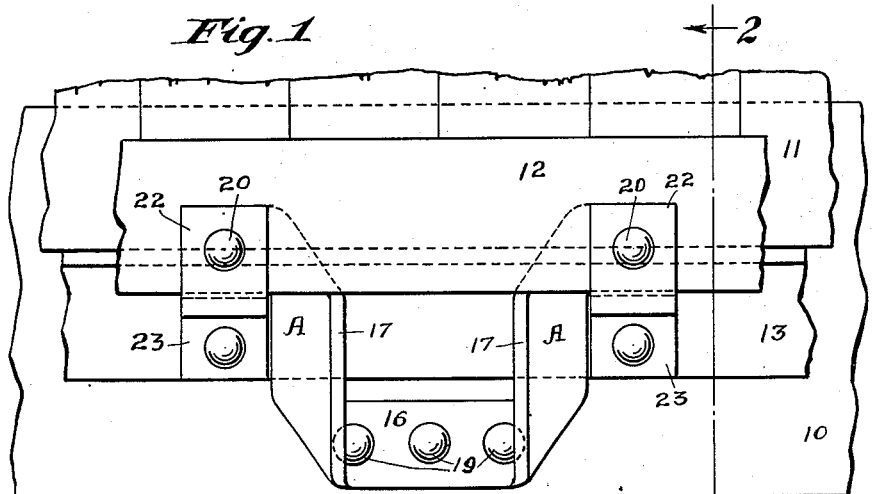
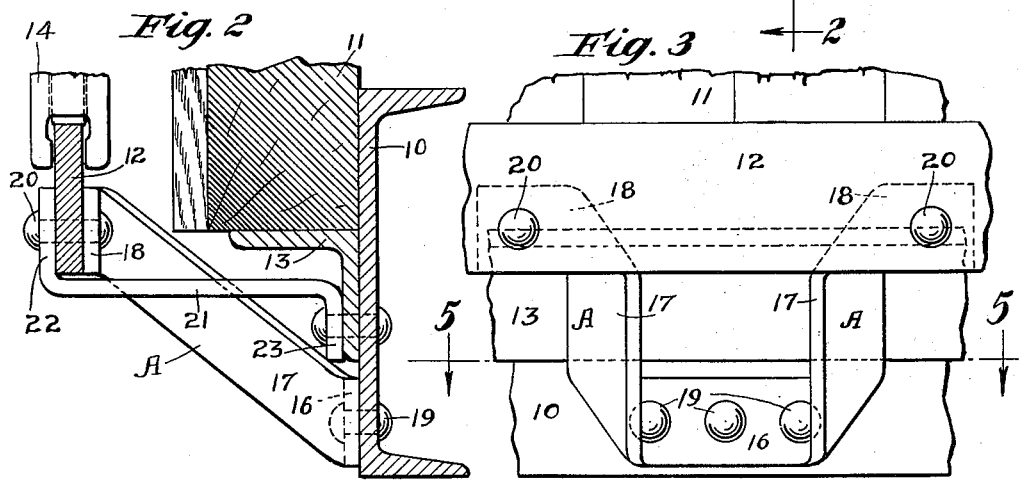
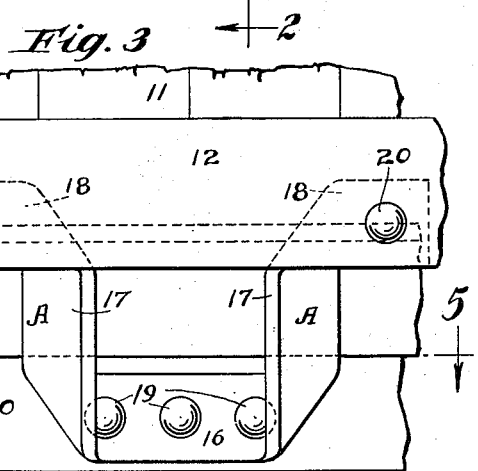
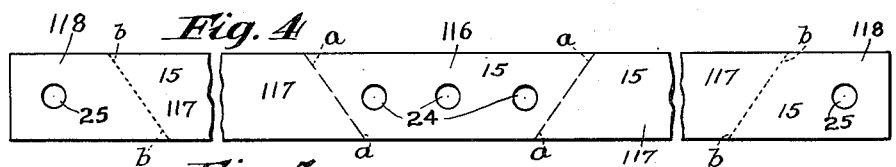
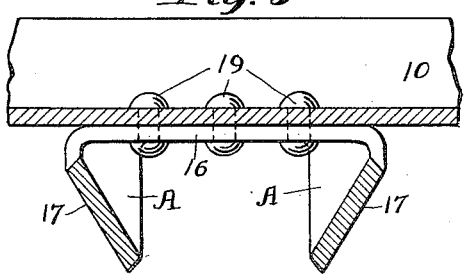
Inventor
Stacy B. Haseltine
By Henry Fuchs
Atty.

May 20, 1952          S. B. HASELTINE          2,597,147
              ONE-PIECE SUPPORTING BRACKET
              FOR TRACKS FOR SLIDING DOORS
Filed Oct. 8, 1947                     2 SHEETS—SHEET 2
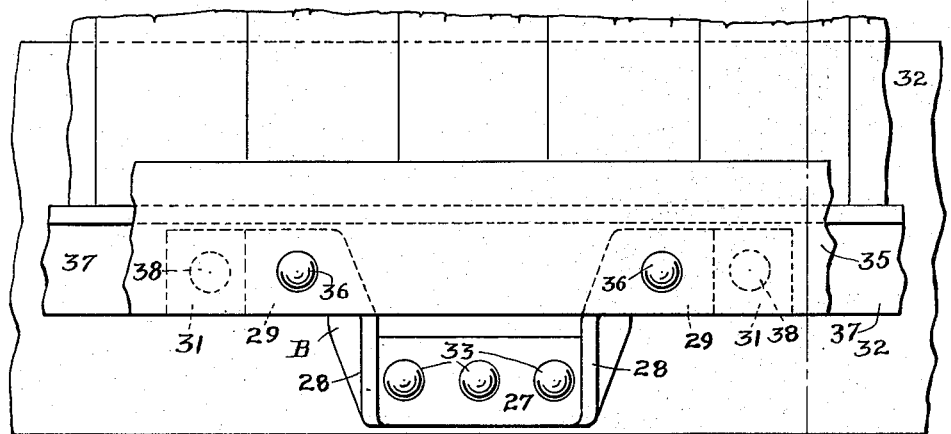
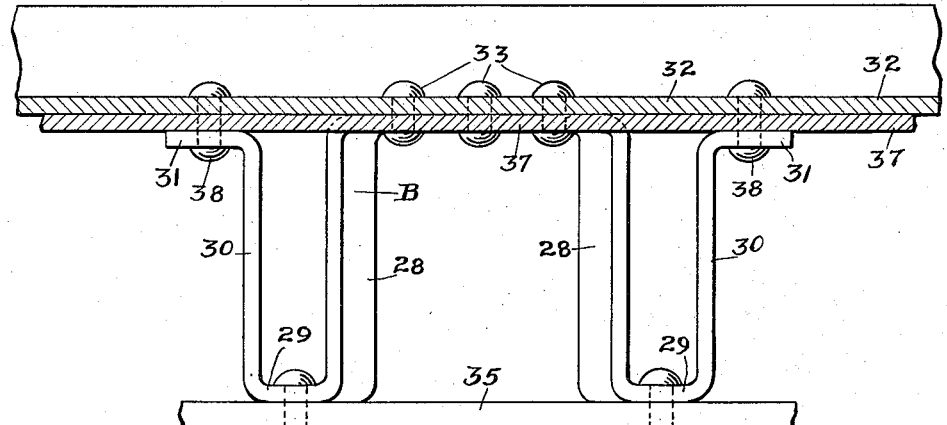
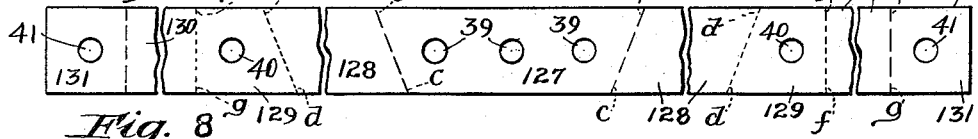
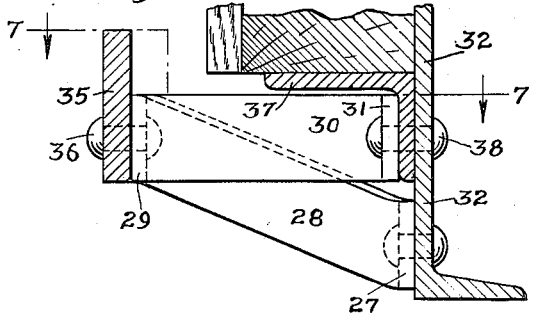
Inventor
Stacy B. Haseltine
By Henry Fuchs.
Atty.

Patented May 20, 1952

2,597,147

UNITED STATES PATENT OFFICE 2,597,147

ONE-PIECE SUPPORTING BRACKET FOR TRACKS FOR SLIDING DOORS

Stacy B. Haseltine, La Grange, Ill., assignor to W. H. Miner, Inc., Chicago, Ill., a corporation of Delaware Application October 8, 1947, Serial No. 778,624

2 Claims. (Cl. 16—94)

This invention relates to supporting brackets for guide tracks for sliding doors of containers and the method of making such brackets.

One object of the invention is to provide a one piece bracket of the character indicated of rugged design, formed by simple bending operations.

A further object of the invention is to provide a one piece bracket for supporting the guide track for a sliding door of a container, comprising a securing section fixed to the container and having upwardly and outwardly extending arms on the outer ends of which the guide track is fixed, supporting the track at an elevation above the securing section of said bracket, the arms being formed integral with said securing section.

A still further object of the invention is to provide a bracket as set forth in the preceding paragraph formed from a flat steel bar of rectangular cross section and of greater width than thickness, by simple bending operations, to provide the securing section and upwardly inclined arms extending therefrom.

Another object of the invention is to provide a one piece supporting bracket formed from a flat steel bar by simple bending operations, comprising a securing section, outwardly and upwardly inclined arms extending from opposite ends of the securing section, right angular, flat track supporting sections at the outer ends of the inclined arms, and inwardly directed, horizontal bracing arms extending from the outer ends of the track supporting sections.

Other objects of the invention will more clearly appear from the description and claims hereinafter following.

In the accompanying drawings forming a part of this specification, Figure 1 is an elevational view, partly broken away, of the side sill member of a car, a portion of the lower section of the side wall, and a portion of the guide track for the door, illustrating my improvements in connection therewith. Figure 2 is a vertical sectional view, corresponding substantially to the line 2—2 of Figure 1. Figure 3 is a broken view, similar to Figure 1, with the horizontal bracing arms for the track omitted. Figure 4 is a plan view of a flat steel bar or blank from which my improved bracket is formed. Figure 5 is a horizontal sectional view, corresponding substantially to the line 5—5 of Figure 3. Figure 6 is a view, similar to Figure 1, illustrating another embodiment of the invention. Figure 7 is a horizontal sectional view, corresponding substantially to the line 7—7 of Figure 8. Figure 8 is a transverse, vertical sectional view, corresponding substantially to the line 8—8 of Figure 6. Figure 9 is a plan view of a flat steel bar from which the improved bracket shown in Figures 6, 7, and 8 is formed.

In said drawings, 10 indicates the side sill of a car, which side sill forms a continuation of the usual side wall 11 of the car. The side wall 11 is provided with the usual opening closed by a sliding door of well-known design, not shown, and the track for supporting the door for sliding movement is indicated by 12. It is the usual practice to provide an angle bar fixed to the side sill of the car for supporting the side wall 11. An angle bar of this character is shown in the drawing, the same being indicated by 13. A portion of the usual sliding carrier on which the door is supported is shown in Figure 2, the same being indicated by 14.

In carrying out my invention, referring first to the embodiment illustrated in Figures 1 to 5 inclusive, I provide a one piece bracket A for supporting the track 12. This bracket is formed from the blank 15, shown in Figure 4, by simple bending operations. The blank 15 is preferably in the form of a flat steel bar of rectangular cross section and of greater width than thickness.

The bracket A comprises a horizontally extending central flat section 16 secured to the outer side of the side sill 10, a pair of laterally spaced, upwardly inclined arms 17—17 extending from opposite ends of the section 16 and formed integral therewith, and angularly extending securing sections 18—18 at the outer ends of the arms 16—16 to which the track 12 is fixed. The bracket A is preferably riveted to the side sill 10 of the car although it may be welded in place. As shown, rivets 19—19—19 engaged through suitable openings in the section 16 of the bracket and the side sill are employed for this purpose. The track 12 is held in place on the bracket by rivets 20—20 engaged through suitable openings in the track and sections 18—18.

As shown in Figure 2, horizontal braces in the form of separate bars 21—21 may be added to give a more firm support to the track. These bars, as shown, have angularly bent securing sections 22 and 23 at the outer and inner ends thereof respectively fixed to the outer side of the track and the vertical web of the angle bar 13. When such bracing bars are used, they are preferably so placed that the rivets 20—20 of the bracket A may be employed to secure the same to the track.

In forming the one piece bracket A from the steel bar blank 15, shown in Figure 4, the bar is bent outwardly along the diagonal lines *a—a* and *a—a* at substantially right angles, thereby forming the securing section 16 and the arms 17—17. The upper edge of the blank shown in Figure 4 corresponds to the upper edge of the sections of the finished bracket, and the portions of the blank from which the securing section 16, arms 17—17, and angular sections 18—18 are formed are indicated respectively by 116, 117—117, and 118—118. The diagonal lines of bending *a—a* and *a—a* diverge towards said upper edge of the blank, thereby causing the arms 17—17 to incline upwardly when the bends have been made. The angular sections 18—18 of the bracket at the outer ends of the arms 17—17 are formed by bending the end sections 118—118 of the blank backwardly at right angles with respect to the sections 117—117 along the diagonal lines *b—b* and *b—b* which also diverge upwardly, the inclinations of these lines being such that the sections 18—18 of the bracket extend horizontally and parallel to the securing section 16. The described bends to form the finished bracket A may be made in succession or the whole blank may be bent to finished form in one stamping operation. The perforations for the rivets 19—19—19 and 20—20 in the sections 16 and 18—18 of the bracket A are preferably made before the bending operations are performed on the blank 15, the perforations for the rivets 19—19—19 being indicated by 24—24—24 and those for the rivets 20—20 being indicated by 25—25 in Figure 4.

Referring next to the embodiment of the invention illustrated in Figures 6 to 9 inclusive, the construction of the bracket, which is indicated by B, is the same as that of the bracket A hereinbefore described, with the exception that a pair of horizontal bracing arms are added, which extend rearwardly from the guide track for the sliding door.

The bracket B shown in Figures 6, 7, and 8 is formed from the blank 26 shown in Figure 9, which is in the form of a flat steel bar of rectangular, transverse cross section. The blank 26 is of considerably greater length than the blank 15.

The bracket B includes a horizontally disposed, central flat section 27, laterally spaced, upwardly inclined arms 28—28 extending from opposite ends of the section 27 and formed integral therewith, angularly extending, securing sections 29—29 at the outer ends of the arms 28—28, and horizontally disposed bracing arms 30—30 extending inwardly from the outer ends of the sections 29—29 and forming integral continuations of said last named sections. The inner ends of the arms 30—30 are bent at right angles and extend laterally from said arms to provide securing flanges 31—31. The section 27 is secured to the outer side of the side sill of the car, which side sill is indicated by 32, rivets 33—33—33 which extend through suitable openings in said section and in the web of the sill being employed for this purpose. The guide track for the sliding door is similar to the track 12 hereinbefore described and is indicated by 35. The track 35 is fixed to the bracket B by rivets 36—36 extending through suitable openings in the sections 29—29 and the track 35 and the angular securing flanges 31—31 are fixed to the outer side of the vertical web of the angle bar 37, which corresponds to the angle bar 13 hereinbefore described, by rivets 38—38 extending through suitable openings in said flanges, the web of the angle bar 37, and the web of the sill 32.

In forming the one piece bracket B from the steel bar blank 26, the bar is bent outwardly along diagonal lines *c—c* and *c—c* at substantially right angles, thereby forming the securing section 27 and the arms 28—28. The upper edge of the blank shown in Figure 9 corresponds to the upper edges of the different sections of the finished bracket B and the portions of the blank from which the section 27, arms 28—28, angular sections 29—29, arms 30—30, and flanges 31—31 are formed are indicated respectively by 127, 128—128, 129—129, 130—130, and 131—131.

The diagonal lines of bending *c—c* and *c—c* diverge toward the upper edge of the blank, thereby causing the arms 28—28 to incline upwardly when these bends have been made. The angular securing sections 29—29 at the outer ends of the arms 28—28 are formed by bending the sections 129—129 of the blank on the diagonal lines *d—d* and *d—d* at right angles to the sections 128—128 and rearwardly with respect to said sections, as viewed in Figure 9. The diagonal lines of bending *d—d* and *d—d* diverge upwardly, as shown, thereby bringing the sections 29—29 of the bracket to a horizontal position, parallel to the section 27. In forming the bracing arms 30—30, the sections 130—130 of the blank are bent backwardly with respect to the sections 129—129 along the straight vertical lines *f—f* and *f—f* at right angles to said sections, thereby disposing the arms 30—30 in horizontal position, parallel to the arms 28—28. To form the securing flanges 31—31, the end sections 131—131 of the blank 26 are bent forwardly at right angles to the sections 130—130 of the blank, as viewed in Figure 9, on the vertical lines *g—g* and *g—g*. The bends of the blank 26 in forming the bracket B may be either made in succession or the whole blank may be bent to finished form in one stamping operation.

The perforations for the rivets 33—33—33, 36—36, and 38—38 in the sections 27, 29—29, and 31—31, respectively, are preferably made before the bending operations are performed on the blank 26, the perforations for the rivets 33—33—33, 36—36, and 38—38 being indicated by 39—39—39, 40—40, and 41—41, respectively in Figure 9.

I claim:

1. A one piece bracket for supporting a horizontal guide track of a sliding door construction from a vertically extending wall, said bracket comprising a horizontally disposed, flat securing section adapted to be fixed to said vertical wall, sections at opposite ends of said securing section bent outwardly at right angles to said securing section, along upwardly diverging lines forming upwardly and outwardly inclined arms, and laterally extending, right angular securing sections at the outer ends of said arms adapted to be fixed to the track.

2. A supporting bracket, said bracket comprising a one piece continuous bar having a central, substantially straight, flat securing section, disposed in a vertical plane, and outwardly projecting straight sections bent at right angles to the longitudinal axis of said first named section along upwardly diverging lines, said last named sections extending from opposite ends of the first named section and inclined with respect to a horizontal plane at right angles to the plane of said securing section and coincident with the longitudinal axis thereof, and a section extending laterally at an angle beyond each of said second named sections to provide securing lugs, said lugs lying in a plane parallel to the plane of said central section.

STACY B. HASELTINE.

REFERENCES CITED

The following references are of record in the file of this patent:

UNITED STATES PATENTS

| Number | Name | Date |
|---|---|---|
| 384,236 | Cronk | June 12, 1888 |
| 391,635 | Moody | Oct. 23, 1888 |
| 713,505 | Schaffer | Nov. 11, 1902 |
| 807,441 | Craig | Dec. 19, 1905 |
| 1,784,029 | Sisson | Dec. 9, 1930 |
| 2,153,388 | Newman | Apr. 4, 1939 |